Feb. 17, 1959  H. A. BING ET AL  2,873,659
PHOTOGRAPHIC APPARATUS FOR EXPOSING AND PROCESSING FILM
Filed Sept. 6, 1956  8 Sheets-Sheet 1

Herbert A. Bing
Richard R. Wareham
Otto E. Wolff
INVENTORS

BY Brown and Mikulka
and
Robert E. Corb
ATTORNEYS

Feb. 17, 1959  H. A. BING ET AL  2,873,659
PHOTOGRAPHIC APPARATUS FOR EXPOSING AND PROCESSING FILM
Filed Sept. 6, 1956  8 Sheets-Sheet 4

INVENTORS
Herbert A. Bing
Richard R. Wareham
BY Otto E. Wolff
Brown and Mikulka
Robert F. Conb
ATTORNEYS Feb. 17, 1959     H. A. BING ET AL     2,873,659
PHOTOGRAPHIC APPARATUS FOR EXPOSING AND PROCESSING FILM
Filed Sept. 6, 1956     8 Sheets-Sheet 7

Herbert A. Bing
Richard R. Wareham
Otto E. Wolff
INVENTORS

BY Brownard Mikulka
and
Robert E. Corb
ATTORNEYS

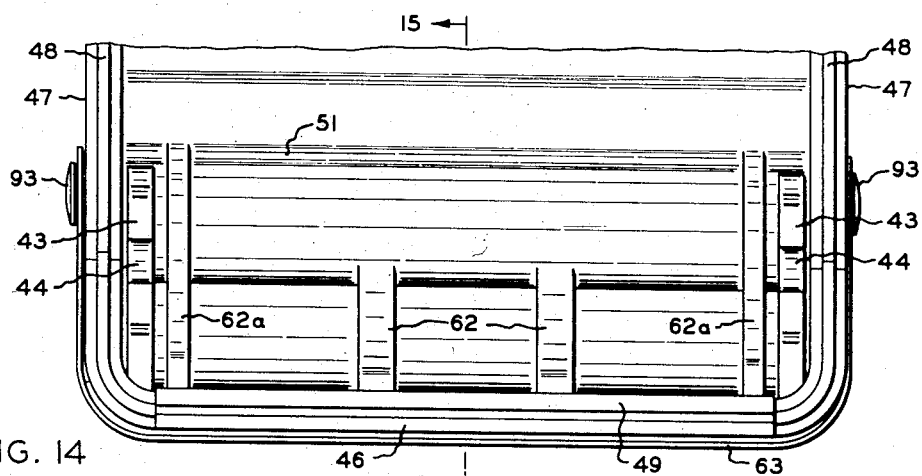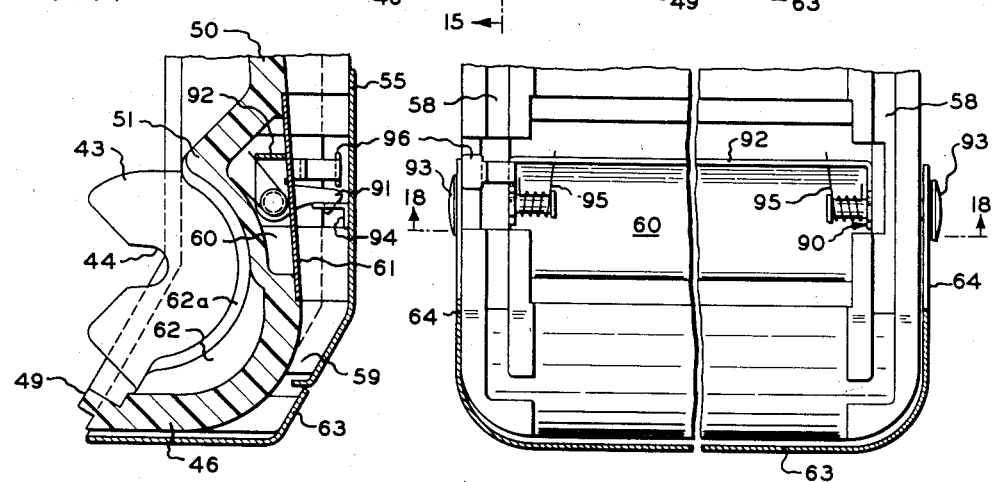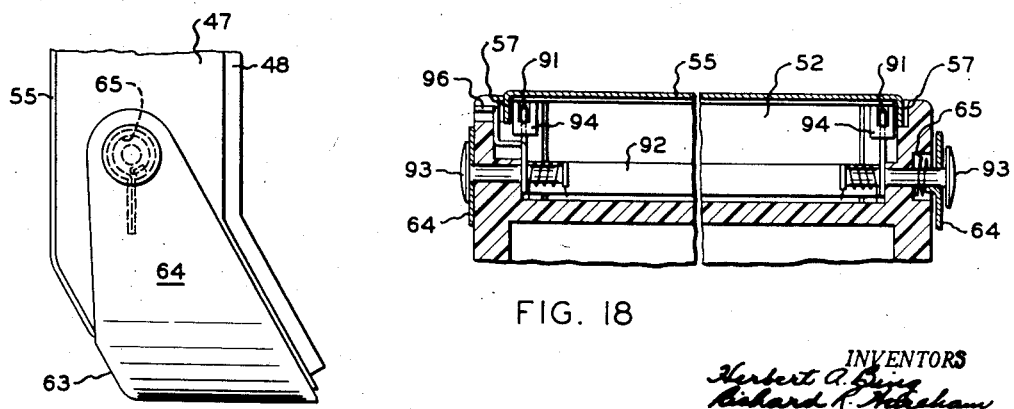

United States Patent Office 2,873,659
Patented Feb. 17, 1959

2,873,659

PHOTOGRAPHIC APPARATUS FOR EXPOSING AND PROCESSING FILM

Herbert A. Bing, Wellesley, Richard R. Wareham, Marblehead, and Otto E. Wolff, Weston, Mass., assignors to Polaroid Corporation, Cambridge, Mass., a corporation of Delaware Application September 6, 1956, Serial No. 608,386

12 Claims. (Cl. 95—13)

This invention relates to photographic apparatus in the form of a camera for exposing and thereafter processing successive frames of a photosensitive sheet, and particularly is concerned with the structure of apparatus of the type wherein successive exposed frames of a photosensitive sheet are superposed with successive areas of a second sheet and a fluid composition is distributed between the associated frames and areas to effect the processing of said frames.

A variety of forms of cameras have been proposed, which are of the type with which the present invention is concerned, and, in general, these cameras include a housing providing means for storing, apart from one another, supplies of a photosensitive sheet and a second sheet, the latter preferably being adapted to provide a support for positive photographic prints; means providing a chamber in which the photosensitive sheet is exposed; and means providing a second dark chamber into which the two sheets are advanced during processing. Processing is preferably effected by advancing the two sheets in superposition between a pair of pressure-applying members for spreading between the sheets a fluid composition carried by rupturable containers associated with the areas of the second sheet adapted to be superposed with exposed frames of the photosensitive sheet. Movement of the sheets through the camera is a manual operation and, accordingly, there is provided a sheet-arresting or indexing mechanism for engaging portions of at least one of the sheets for arresting the movement of the sheets when each successive frame of the photosensitive sheet is in position for exposure, and then releasing the sheets for movement following exposure when it is desired to process the exposed frame.

Cameras of the type described vary to a great extent in the particular construction, mounting and operation of the pressure-applying members and the indexing mechanism. Regardless of the particular construction of each of the cameras, however, the two sheets must be threaded between a pair of pressure-applying members and, in the case of an indexing mechanism including means for engaging at least a portion of one of the sheets, between at least two members comprising the indexing mechanism and adapted to function in opposition to one another. This necessity for threading and moving the sheets between two pairs of members has led to a variety of camera constructions which heretofore have involved mounting the members of at least one, and usually both, of the pairs on different and relatively movable sections of the camera housing. This, in turn, has necessitated a rather complicated and relatively expensive housing construction since the housing sections, in most cases numbering three, must be strong and accurately constructed so that the members of each pair will be properly positioned with respect to one another and will coact, against one another, when the sections of the housing are operatively assembled or joined.

The present invention has, as an object, the provision of a novel camera wherein successive frames of a photosensitive sheet are exposed and thereafter advanced into superposition with successive areas of a second sheet and the two sheets moved between a pair of members comprising a pressure-applying mechanism for distributing a fluid composition between associated frames and areas of the sheets to form a sandwich and effect the processing thereof, the camera comprising two relatively movable housing sections and a unitary device mounted on one of the sections and including a pressure-applying mechanism and an indexing mechanism comprising means for engaging at least a portion of one of the sheets for predeterminedly arresting the movement of the sheets.

Another object of the invention is to provide a camera as described wherein the section mounting the unitary device comprising the pressure-applying and indexing mechanisms includes means for mounting supplies of the photosensitive sheet and the second sheet and means providing a dark chamber into which the sandwich is advanced during processing, and is positionable apart from the other housing section to permit loading and threading of the sheets into the camera and through the pressure-applying and indexing mechanisms, the two housing sections cooperating to provide a chamber within which successive frames of the photosensitive sheet are located for exposure.

A further object of the invention is to provide a unitary device as described wherein said pressure-applying mechanism comprises a pair of members between which the sheets are moved, means for urging the members toward one another to apply compressive pressure to the sheets, and manually operable means for spacing the members apart from one another to permit threading of the sheets therebetween, and said indexing mechanism comprises at least a pair of engagement members between which the sheets are moved, one of said engagement members being movable with respect to the other of said engagement members and being adapted to act in opposition with the other engagement member for engaging at least portions of one of the sheets and arresting the movement of the sheets, and manually operable means for manipulating the one movable engagement member so as to permit the movement of the sheets between the said engagement members and for so positioning said one engagement member as to permit the threading of the sheets between the pair of engagement members comprising the indexing mechanism.

Still another object of the invention is to provide a novel camera substantially as described, characterized by its simplicity and inexpensiveness of construction and its ease of operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 14 is a fragmentary front elevational view illustrating the lower portion of the rear section of the camera housing;

Fig. 15 is a diagrammatic sectional view taken substantially along the line 15—15 of Fig. 14;

Fig. 16 is a fragmentary rear elevational view similar to Fig. 14, shown with elements of the camera removed;

Fig. 17 is a side elevational view of the portion of the camera shown in Fig. 16; and Fig. 18 is a fragmentary diagrammatic sectional view taken substantially along the line 18—18 of Fig. 16.

Figure 1:
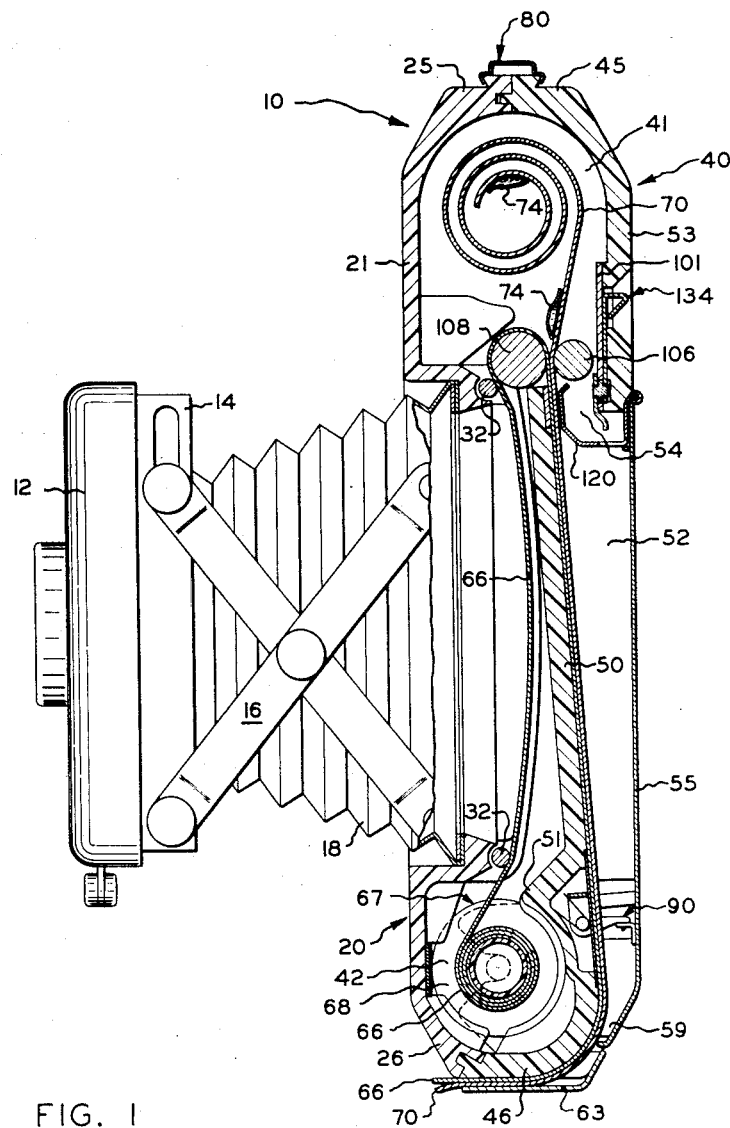
Figure 1 is a side elevational view, partially in section, of a preferred form of camera embodying the invention.
Figure 2:
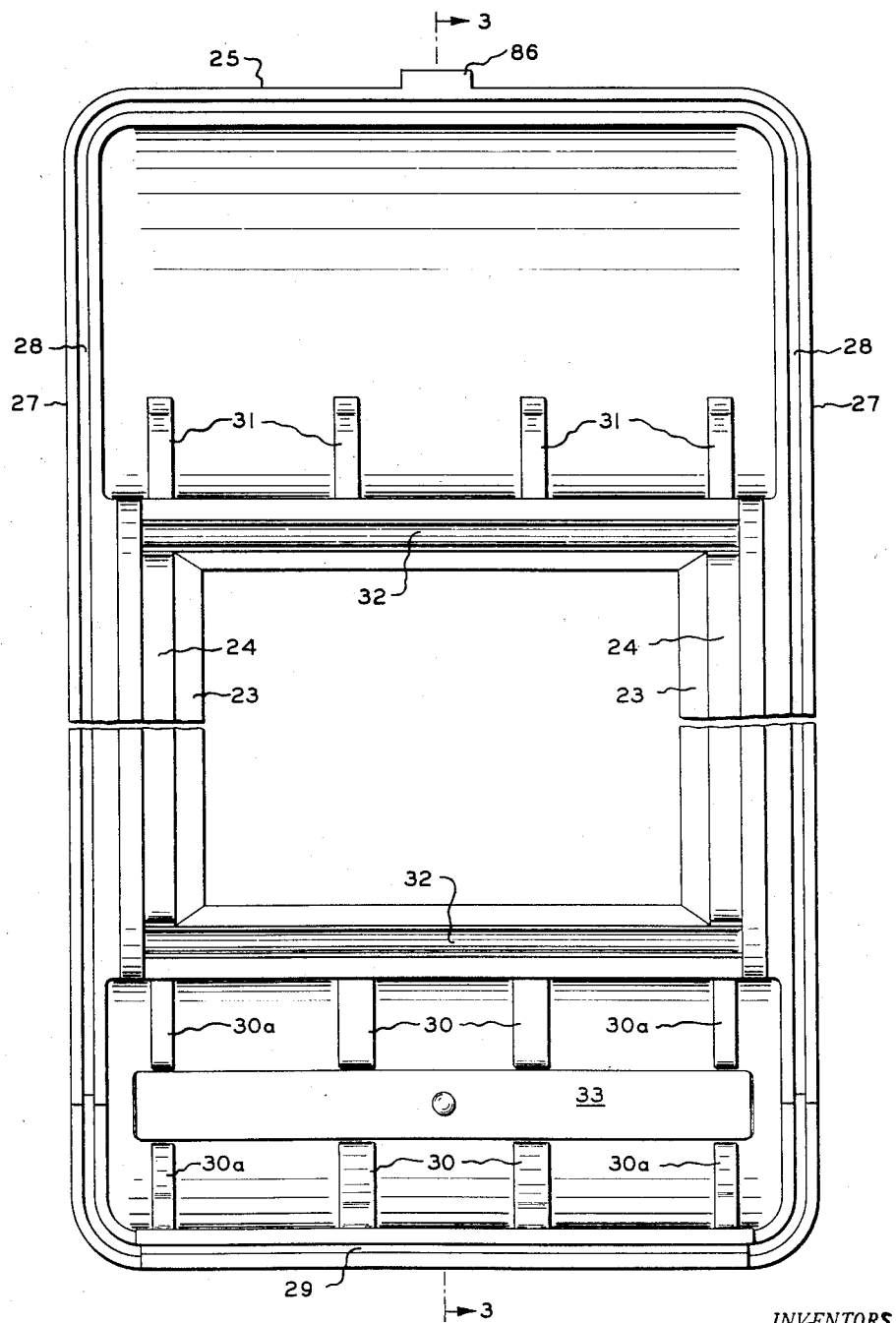
Fig. 2 is a fragmentary rear elevational view of the front section of the housing of the camera of Figure 1.
Figure 3:
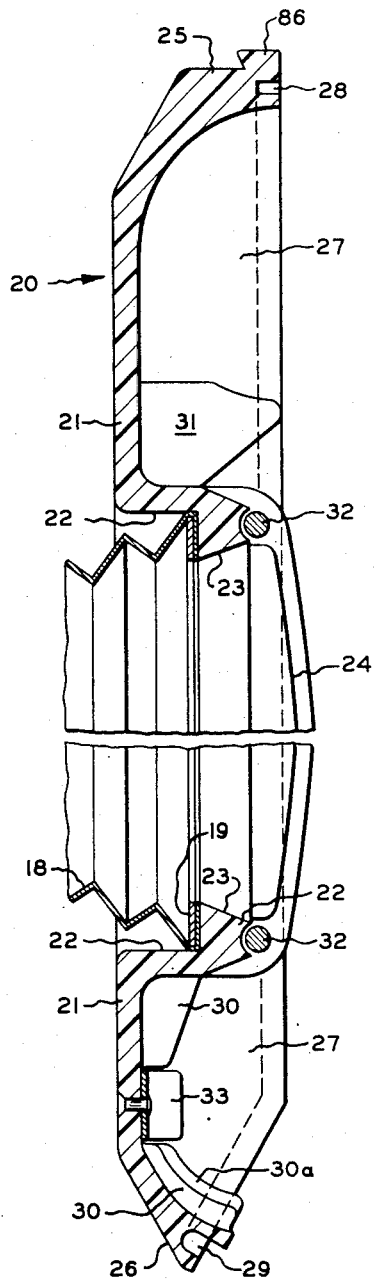
Fig. 3 is a fragmentary sectional view taken substantially along the line 3—3 of Fig. 2.
Figure 4:
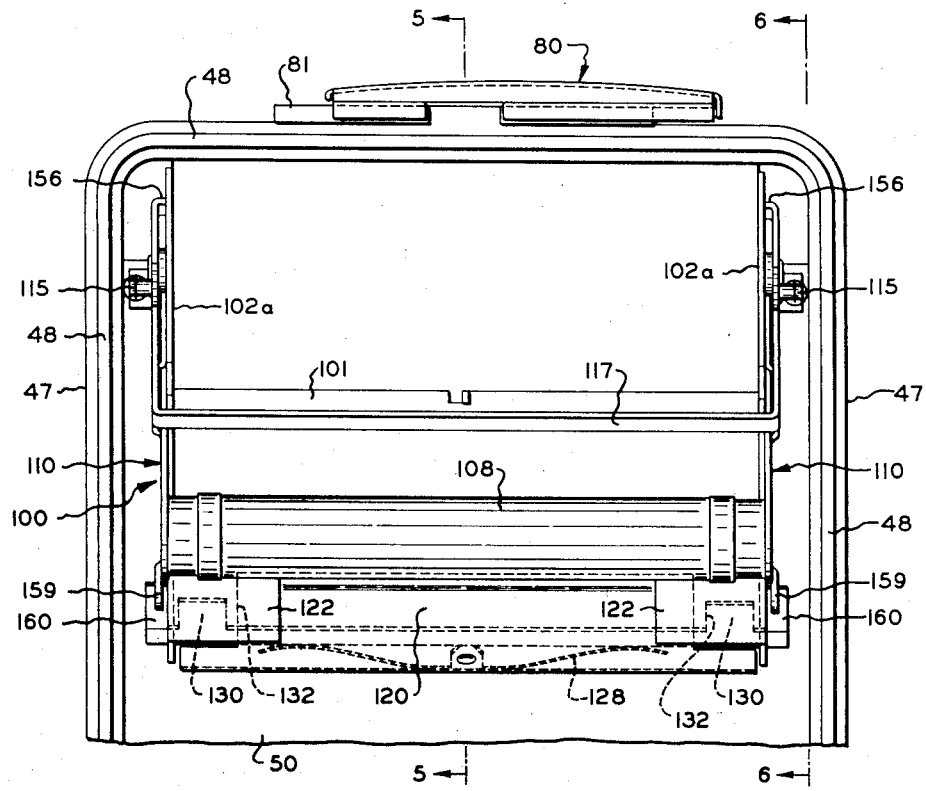
Fig. 4 is a front elevational view of the upper portion of the rear section of the camera housing illustrating the operating mechanism thereof.

A camera of the present invention is arranged for exposing and processing successive frames of a photosensitive sheet which preferably includes a layer of a photosensitive silver halide on a suitable support or backing. This processing is accomplished by superposing each exposed frame of the photosensitive sheet with an area of a second sheet and distributing a fluid composition between the associated frame and area to form a sandwich. The camera includes a chamber containing means for locating successive frames for exposure, another chamber in which successive frames and areas are superposed and the fluid composition distributed therebetween, and a dark chamber or processing chamber into which the sandwich is advanced as it is formed. The fluid composition is preferably spread in a thin layer between the sheets by movement thereof between a pair of pressure-applying members, the fluid composition preferably being carried in rupturable containers associated with the areas of the second sheet. The second sheet is preferably adapted to serve as a support for an image-receptive layer in which a visible print of a latent image in the photosensitive layer may be produced and the fluid processing composition, when spread in a uniformly thin layer between the photosensitive and second sheet, preferably effectuates a silver halide diffusion transfer-reversal process by which a latent image in the photosensitive sheet is developed and a positive print is produced in the second sheet.

Examples of photographic materials useful in processes of the foregoing type are described in detail in Patent No. 2,543,181, issued to Edwin H. Land on February 27, 1951. It is, of course, to be understood that the apparatus herein described is not limited to use with any particular species of photosensitive or second sheets, the terms "photosensitive" and "second sheet" being used in their broadest sense to indicate a first sheet which is photosensitive and a second sheet which merely may aid in spreading the fluid processing composition over the surface of the photosensitive sheet or which may, if desired, possess other characteristics.

The present invention is primarily concerned with improvements in the construction and operation of this type of camera and specifically improvements in the operating mechanism of the camera and the overall structure of the camera housing or casing made possible thereby. As pointed out, cameras of this type generally include a mechanism for applying pressure to the superposed sheets to spread a fluid processing composition therebetween and an indexing mechanism for engaging and predeterminedly arresting the movement of the sheets through the camera. Each of these mechanisms includes at least a pair of members between which the sheets must be moved so that provision must be made for spacing these members apart to permit loading of the camera and threading of the sheets therebetween. Heretofore, this has been accomplished by providing the camera housing or casing as several relatively movable sections and mounting the members of each pair on the different section. In one type of camera, for example as shown in Patent No. 2,455,111, issued November 30, 1948 in the name of Carbone et al., the camera housing comprises forward, intermediate and rear sections, with the forward section mounting the exposure means and spring means for urging the pressure-applying members toward one another. The intermediate section mounts one of the pressure-applying members and one of a pair of members comprising the indexing mechanism, while the rear section mounts the other pressure-applying member and the remaining components of the indexing mechanism. The intermediate and rear sections are secured by hinges to the forward section at opposite ends thereof and the intermediate section cooperates with the forward section to provide an exposure chamber in which successive frames of the photosensitive sheet may be positioned for exposure, and with the rear section to provide a processing chamber in which the sandwich is positioned during processing. The three sections of this type of camera must necessarily be accurately fabricated of strong materials and carefully assembled so that the components of the fluid-spreading or pressure-applying mechanism and the indexing mechanism are correctly positioned with respect to one another and coact against one another so as to function properly.

In the present invention all of the components of both the indexing and fluid-spreading mechanisms comprise a single unitary device comprising a single support member which may be mounted conveniently on one section of the camera housing. By virtue of this novel construction, the camera housing or casing may comprise only two sections rather than three, and these two sections can be easily and inexpensively fabricated, for example of molded plastic materials, since accuracy and strength are of lesser importance. In regard to this concept of a camera casing comprising two relatively movable sections and, together with the provision of a fluid-spreading mechanism as a single unit mounted on one of the sections, reference may be had to the apparatus shown in Patent No. 2,435,717, issued February 10, 1948 to Edwin H. Land. In this apparatus, however, the sheets are moved in response to rotation of the pressure-applying rolls rather than, as in the present invention, by manually applied tension. Accordingly, there is no indexing mechanism including a pair of members between which the sheets must be advanced with one of the members being adapted to engage at least a portion of one of the sheets for arresting their movement. The present invention resides, at least in part, in the provision of a novel camera construction wherein a pressure-applying mechanism and an indexing mechanism are embodied in a single unitary device mounted on one section of a two-section camera housing.

Reference is now made to the drawings, and particularly to Fig. 1, wherein there is shown, partially in section, an inexpensive hand-held camera of the folding type embodying the invention. The camera is shown in a loaded condition with a photosensitive sheet and a second sheet mounted therein and threaded therethrough, the thicknesses of the sheet materials being exaggerated for purposes of illustration. The camera comprises a housing or casing generally designated at 10 for supporting and enclosing the various components of the camera and includes an exposure aperture, in this case associated with a lens and shutter assembly 12, which may be of any suitable conventional design and construction. Housing 10 comprises a forward section 20 and a rear section 40, section 20 having a front portion 21 which provides a central reentrant section 22 having a light-transmitting aperture 23. Reentrant section 22 further provides a pair of guide tracks 24 on either side of aperture 23 for engaging the margins of a photosensitive sheet and positioning frames thereof for exposure at the focal surface of the lens of assembly 12. A pair of guide rolls 32 may be provided above and below aperture 23 and pivotally mounted so as to support and guide the photosensitive sheet across the aperture.

The position of the camera and components thereof, as shown in the drawings, together with the directions employed in describing the construction and operation of the camera, are used for purposes of clarity of illustration and description only and are not intended to indicate any special position of the camera during actual use.

Lens and shutter assembly 12 is mounted on a support plate 14, the latter being mounted on, and secured to, a conventional scissors type erecting mechanism 16, illustrated in Fig. 1 in extended position. Erecting mechanism 16 is secured within reentrant section 22, the latter being adapted to house the erecting mechanism and at least a portion of assembly 12 when mechanism 16 is folded. A suitable bellows 18, attached at one end to reentrant section 22 and at its other end to assembly 12, provides an optical path between the lens of assembly 12 and a photosensitive sheet positioned for exposure on guide tracks 24. The bellows is secured to reentrant section 22 in a lighttight manner by such means as an aperture-clamping plate 19.

Rear housing section 40 is provided as a unitary structure apart from forward housing section 20 and is adapted to be secured at the rear of the latter. Forward housing section 20 is provided with upper, lower and side walls designated, respectively, 25, 26 and 27 and extending rearwardly. Rear housing section 40 includes forwardly extending upper, lower and side walls designated, respectively, 45, 46 and 47 and so formed as to be aligned with the corresponding walls of the forward section. The forward and rear housing sections are adapted, when secured together, to form a lighttight enclosure and for this purpose the mating edges of upper wall 25 and side walls 27 are formed with a groove 28, and the mating edges of upper wall 45 and side walls 47 are formed with a matching tongue 48 adapted to enter groove 28 to form a lighttight juncture.

The two housing sections are secured together at their lower ends by an upwardly inclined locking tongue 49 on lower wall 46 and a matching downwardly inclined locking groove 29 in lower wall 26, and at their upper ends by a latch generally designated at 80. Latch 80 comprises a raised, generally parallelepiped shaped mounting member 81 extending forwardly beyond the mating edge of upper wall 45 and preferably is formed integrally therewith. A channel-shaped locking element 82 is slidably secured to mounting member 81 and includes side walls 83 extending on opposite sides of mounting member 81. Mounting member 81 includes a generally rectangular recess 84 in its forward side adapted to be at least partially closed by one side wall 83 of locking element 82 when the latter is in a locked position. The last-mentioned side wall 83 includes a rectangular opening 85 adapted to be aligned with recess 84 when element 82 is in an unlocked position. Upper wall 26 is provided with an upwardly projecting member 86 adapted to enter into and be seated within recess 84 when the two housing sections are joined. When locking element 82 is in an unlocked position with opening 85 aligned with recess 84, projecting member 86 may be freely introduced into and withdrawn from recess 84. Element 82 is slidable to a locked position with opening 85 out of alignment with recess 84 and with one of walls 83 extending at least part way across the recess so as to prevent member 86 from being withdrawn therefrom. A latch spring 87 is provided between the upper surface of mounting member 81 and locking element 82 and includes a detent portion 88 adapted to project through a hole 89 in locking element 82 for retaining the latter in locked position. Detent 88 may be manually depressed from engagement in hole 89 to permit sliding movement of the locking element into unlocked position.

One example of a supply of photosensitive sheet 66, adapted to be exposed and processed within the illustrated camera and shown mounted within the camera, includes a photosensitive sheet which preferably comprises a suitable base and a suitable photosensitive layer on one side of the base. The photosensitive layer, for example, may be composed of a silver halide emulsion and is provided with a succession of frames that are adapted to receive a succession of latent images upon photoexposure. The supply of sheet 66 is carried by a spool 67 of conventional design and having a spindle around which sheet 66 is coiled, a pair of disks 68 adjacent to opposite ends of the spindle for aligning the successive convolutions of sheet 66, and a pair of stub shafts extending from opposite ends of the spool.

Second sheet 70, in conjunction with which photosensitive sheet 66 is processed, is shown in Fig. 1 as being supplied from a roll. Sheet 70 preferably comprises a suitable base and an image-receiving layer on one side of the base, the image-receiving layer, for example, comprising one of the compositions now well known in the art which adapt it to receive, in successive image-receiving areas thereof, positive prints of the latent images in frames of photosensitive sheet 66. A succession of containers 74 are provided for carrying the fluid processing composition and, as shown, are affixed to the image-receiving layer of sheet 70 at substantially regularly spaced intervals from a location adjacent a leading end thereof toward the trailing end thereof, the containers being so spaced that one container is associated with one image-receiving area. Each container is provided with a rupturable mouth facing the trailing edge of sheet 70, which mouth is adapted to eject a fluid processing composition when opposed compressional forces are applied to the container.

Front portion 21 of forward housing section 20, located above and below reentrant section 22, cooperates with portions of rear housing section 40 to provide a pair of generally cylindrical storage chambers designated as upper storage chamber 41 and lower storage chamber 42. Upper chamber 41 is intended to mount and enclose the roll of second sheet 70 and lower storage chamber 42 is designed to mount and enclose a spool 67 around which is coiled a supply of photosensitive sheet 66. The present invention comprehends loading of the camera by mounting the supplies of the photosensitive and second sheets on rear housing section 40, threading the two sheets through the pressure-applying and indexing mechanisms also mounted on rear housing section 40, and then securing the two housing sections together.

Accordingly, upper and lower storage chambers 41 and 42 are, for the main part, located in and formed by the rear housing section. Means are provided on rear housing section 40 within lower chamber 42 for mounting spool 67 and, in the form shown, comprise a pair of mounting members 43 located adjacent side walls 47 and having forwardly extending slots 44 adapted to receive stub shafts on the ends of spool 67. The interior (or rear) surface of the lower front portion 21 which defines the forward wall of lower storage chamber 42 may be provided with a plurality of ribs, designated 30 and 30a, for the purpose of strengthening the forward housing section and aiding in properly positioning the supply of sheet 66 within the chamber. A plurality of rearwardly projecting ribs 31 may be provided as shown on the upper front portion 21 for strengthening the upper part of section 20 and aiding in positioning the roll of sheet 70.

It will be apparent from the drawings that photosensitive sheet 66 is coiled on spool 67 with its photosensitive surface or emulsion surface located outermost. Accordingly, means are provided with storage chamber 42 for preventing scratching of the photosensitive surface by contact with the walls of the chamber and the strengthening ribs located therein, and means specifically for resisting the rotation of the spool so as to prevent the uncoiling of the photosensitive sheet due to its own resiliency. This last-mentioned means comprises a leaf spring 33 secured mediate its ends to front portion 21 within chamber 42 so that its ends will bear against and frictionally engage disks 68 adjacent the ends of spool 67. A plurality of curved ribs, designated 62 and 62a, are provided on lower wall 46 in chamber 42 for strengthening wall 46. These ribs in chamber 42 on both housing sections include two pairs of centrally located ribs 30 and 62 and two pairs of outer ribs 30a and 62a located adjacent the ends of chamber 42. Ribs 30a and 62a are located in position to engage the margins of the photosensitive sheet adjacent disks 68 and project inwardly a greater distance than do ribs 30 and 62 so that, should the photosensitive sheet uncoil, ribs 30a and 62a would engage the margins of the photosensitive sheet and prevent the sheet from contacting the pairs of central ribs 30 and 62.

Rear housing section 40 includes means providing an intermediate wall 50 which cooperates with the forward housing section to form a chamber through which photosensitive sheet 66 is advanced from spool 67 and within which successive frames of the photosensitive sheet are positioned during exposure. Intermediate wall 50 is further adapted to aid in holding photosensitive sheet 66 against guide surfaces 24 in position for exposure. For this purpose intermediate wall 50 includes a forwardly extending enlarged section 51 forming one portion of lower storage chamber 42 and being constructed so as to urge the photosensitive sheet into contact with one end of guide surfaces 24 when the two housing sections are joined.

Intermediate wall 50 extends upward from the rear of lower chamber 42 and is inclined slightly forward so as to define the forward wall of a processing chamber 52 into which a sandwich, comprising a superposed photosensitive sheet 66 and a second sheet 70 with a layer of fluid processing composition therebetween, may be advanced and positioned during processing. The upper portion of rear housing section 40 comprises a relatively short rear wall 53 defining the rear wall of upper storage chamber 41 and forming, in conjunction with intermediate wall 50, a passage 54 between chamber 41 and chamber 52. It is within upper storage chamber 41 and this last-mentioned passage that the fluid-spreading and indexing mechanisms are mounted so as to superpose the two sheets and spread a fluid composition therebetween, forming a sandwich which is advanced into processing chamber 52.

The rear wall of processing chamber 52 is defined by a door 55 mounted on a hinge 56 on rear wall 53 and extending from side to side of the rear housing section and to the lower end of intermediate wall 50 where the latter joins lower wall 46. Door 55 is provided with forwardly extending flanges 57 at its lateral margins adapted to enter into grooves 58 in the rear portions of side walls 47 for sealing the processing chamber against the admission of light. The lower end portion of door 55 is curved forwardly so as to extend part way around a curved portion of rear housing section 40 at the juncture of intermediate wall 50 and lower wall 46. A shallow passage, designated 59, is provided between the lower curved end portion of door 55 and the juncture of walls 46 and 50 through which sheet materials may be drawn. Suitable means may be provided on rear wall 53, in the upper portion of door 55 adjacent hinge 56, or in association with the hinge, for preventing light from entering therebetween into the processing chamber.

Latch means are provided for retaining door 55 in closed position and, as shown in Figs. 1, 15 and 18, comprise a pair of rearwardly extending hooklike arms 91 joined by an elongated connecting arm 92 pivotally mounted in a recess 60 in enlarged section 51 of intermediate wall 50 on a pair of headed studs 93 which are secured in, and extend through, side walls 47 into recess 60. Arms 91 extend rearwardly adjacent side walls 47 and are adapted to engage openings in forwardly extending members 94 secured on the inside of the lower portion of door 55. A torsion spring 95 is provided coiled around each of the studs for urging arms 91 in a clockwise direction, viewing Fig. 15, so as to retain them in latched position. As a means for releasing the latch to permit the door to be pivoted to an open position, there is provided, secured to arm 92, a rearwardly extending engagement arm 96 having a button on one end which is manually engageable for pivoting the arms 91 and arm 92 against the bias of spring 95. A cover plate 61 is secured to intermediate wall 50 in covering relation to recess 60 and may, if desired, be removable for providing ready access to the recess.

Means are provided for aiding in preventing the admission of light through passage 59 and for severing portions of sheet materials extending through the passage from portions of the sheet materials remaining within processing chamber 52. In the form shown, this means comprises a cutter bar 63 mounted between a pair of arms 64 extending on opposite sides of the camera housing and pivotally mounted on studs 93. Bar 63 is pivotable from a closed position, shown in Figs. 1, 15 and 17, wherein it extends adjacent lower wall 46 and across the open end of passage 59, to an open position at the rear of the camera. A torsion spring 65 is provided in a recess in one of walls 47 coiled around one of studs 93 for resiliently urging the cutter bar into closed position. When the cutter bar is in this last-mentioned position, sheet materials extending through passage 59 are retained between the bar and lower wall 46 and may be severed by drawing or tearing them against the edge (forward) of the bar, which may be sharpened for this purpose. The bar may be pivoted to a rearward position, enabling the operator to grasp the portion of the sheet materials underlying the bar and providing a leader for drawing the sheet materials through the passage.

As previously mentioned, the present invention envisions a single unitary device comprising means for applying compressive pressure to the sheets to spread a fluid processing composition therebetween, and an indexing mechanism for arresting the movement of the sheets. This unitary device comprises a generally U-shaped frame member 100 on which are mounted substantially all the components of the pressure-applying means and indexing mechanism and including a base section 101, at which the frame is secured within chamber 41 to rear wall 53, and a pair of forwardly extending arms 102. Each of arms 102 includes an enlarged section 102a located uppermost in chamber 41 and being generally round in shape so as to conform approximately to the shape of the chamber, and a second or smaller section 102b which extends into passage 54 between walls 50 and 53. Each of sections 102a and 102b is separated by a recess or V-shaped slot 104 in each arm 102, each slot 104 having a rounded apex adapted to seat a bushing 105.

The pressure-applying means of the present invention comprise a pair of cylindrical pressure-applying rolls 106 and 108, each including a pair of stub shafts at its ends, said stub shafts being designated, respectively, 107 and 109. Pressure-applying roll 106 is mounted with stub shafts 107 journaled in bushings 105. Pressure-applying roll 108 is mounted with its axis parallel with the axis of roll 106 and for movement toward and away from roll 106. As a means for mounting arm 108, there is provided a pair of mounting arms 110 each pivotally secured intermediate its ends, by a stud 111, to one of arms 102 at enlarged section 102a thereof. One end of each of mounting arms 110 extends between arm 102 and side wall 47 to a location opposite V-shaped slot 104, and in this end of each of mounting arms 110 is secured a bushing 112 in which a stub shaft 109 on pressure-applying roll 108 is journaled. The pressure-applying rolls are biased toward one another so as to apply compressive pressure to sheet materials advanced therebetween and for this purpose there is provided a pair of tension springs 114, each secured at one end to a stud 115 secured to a release lever 116 at a location adjacent the forwardmost portion of arm 102. Each spring 114 is secured at its opposite end to the end of mounting arm 110 and, by virtue of this arrangement, urges one end of mounting arm 110 forward, pivoting the arm in a counterclockwise direction, viewing Figs. 6 and 7, and thereby urging pressure-applying roll 108 in a rearward direction into juxtaposition with roll 106.

Manually operable means are provided for spacing pressure rolls 106 and 108 apart to permit loading of the camera and threading of the sheet materials between the rolls. This means comprises the aforementioned release lever 116 which includes a pair of crank arms 118 pivotally mounted on studs 119 secured in the forward portion of sections 102a and a connecting bar 117 for pivoting both arms 118 simultaneously. Each of crank arms 118 is pivotable in a counterclockwise direction from an operative position, shown in Fig. 6, wherein springs 114 are in tension, to an inoperative position, shown in Fig. 7. As the crank arm is pivoted to inoperative position, stud 115 is moved upward and rearward, first releasing the tension on spring 114 and then applying compression thereto, so that the spring functions as a substantially rigid link between crank arm 118 and mounting arm 110 for causing the mounting arm to be pivoted in a clockwise direction and thereby spacing roll 108 apart from roll 106. It will be noted that when crank arm 118 is in operative position the spring in tension is on a line from stud 115 to the end of arm 110 to one side of stud 119 so that the mechanism has a tendency to remain in operative position. During pivotal movement of crank arm 118, stud 115 must be moved to the opposite side of stud 119 so that a toggling effect is produced, tending to retain the mechanism in inoperative position. A guide plate 98 is pivotally mounted between arms 102 within chamber 41 for facilitating loading the camera by guiding the sheets between the pressure-applying rolls. Plate 98 is pivotable to provide access to the rolls and to the mechanism of the camera.

The indexing mechanism of the invention comprises means for engaging a portion of one of the sheets for arresting the movement of the sheets and, in the present invention, second sheet 70 is preferably adapted to this purpose. As hereinbefore mentioned, second sheet 70 comprises a succession of image-receiving areas adapted to be superposed with exposed frames of photosensitive sheet 66. A pair of generally L-shaped traps or engagement elements 76 are secured to the outside surface of second sheet 70 adjacent the margins thereof at the trailing end of each image-receiving area. The L-shaped traps 76 perform the dual functions of, first, providing elements adapted to be engaged by the indexing mechanism for arresting the movement of the sheets and, secondly, for trapping excess fluid processing composition. In regard to this latter function, it is pointed out that the quantity of fluid processing composition provided in each container associated with an image-receiving area is usually greater than that required and, so that excess fluid is not spread from between one superposed frame and area to the next superposed frame and area, means are provided adjacent the trailing end of each area for spacing the pressure-applying rolls apart to provide a space between the sheets in which the excess fluid is trapped.

The indexing mechanism comprises a support plate 120 mounted on base 101 and including a portion extending within passage 54 from side to side thereof and forwardly and upwardly toward the bite of rolls 106 and 108 to provide a support surface across and in contact with which second sheet 70 is movable through passage 54 from between the rolls. The forward end sections of portions 102b are turned inwardly toward one another to provide a pair of backing plates 122 adapted to engage at least the margins of photosensitive sheet 66 as the two sheets are advanced in superposed relation through the passage between support plate 120 and backing plates 122.

A sheet-engagement bar 124 is mounted for limited pivotal movement underlying support plate 120. Bar 124 is mounted adjacent each of its ends in a generally rectangular opening 126 in portion 102b of arm 102. The mounting is such that bar 124 is pivotable about its longitudinal axis and is movable, to a limited extent, in a plane generally parallel with the plane of movement of the sheet materials across support plate 120. An elongated leaf spring 128 is provided secured to the underside of support plate 120 for urging bar 124 upwardly (toward rolls 106 and 108) and for pivotal movement in a counterclockwise direction, viewing Figs. 6 through 8. Bar 124 includes a pair of forwardly extending engagement portions 130 which project through openings or recesses 132 in support plate 120 into the passage between the support plate and backing plates 122. Sheet-engagement bar 124 has three positions designated an engagement position, an arresting position and a release position and, shown, respectively, in Figs. 8a, 8b and 8c. In the engagement position shown in Fig. 8a, bar 124 is at the upward limit of its movement and engagement portions 130 project above the forward surface of support plate 120 into contact with the surface of second sheet 70 in position to engage a pair of traps 76 as the latter are moved between the support plate and backing plates 122. As engagement portions 130 are engaged by a pair of traps 76, bar 124 is moved downward to its limit of movement, that is, to arresting position, at which point the sheets are jammed between engagement portions 130 and backing plates 122 and movement of the sheets is arrested. To release the sheets for continued movement, bar 124 is pivoted in a clockwise direction to release position, thereby displacing the engagement portions rearwardly and withdrawing the engagement portions from engagement with traps 76 and allowing the return movement of the bar upwards under the bias of spring 128 to engagement position, wherein the engagement portions are in position to engage the next successive pair of traps as the latter are moved downward between the pressure-applying rolls through the passage between plate 120 and backing plates 122.

Release means manually operable from the exterior of the camera housing are provided for pivoting bar 124 from arresting position to release position to permit its return movement to engagement position and thereby allow for the continued movement of the sheet materials. This release means includes a release lever generally designated 134 and comprising two sections mounted on stud 136 secured through base 101 of frame 100. Release lever 134 includes a first manually engageable section 138 mounted at the rear of base 101 between the latter and rear wall 53 and having an overturned manually engageable end portion 137 which projects through a curved slot 140 in rear wall 53 of the camera casing. Stud 136 includes a central section 136a intermediate its ends which is round in shape and provides means for pivotally mounting the stud in a round hole in base 101 and a pair of end sections, designated 136b, which are not round and, in the form shown, are square in shape. First section 138 includes a square hole at its end opposite end portion 139 adapted to receive one end section 136b of stud 136 so that pivotal movement of first section 138 is transmitted to the stud. Lever 134 includes a second section 142 mounted on the forward side of base 101 and having a square hole adapted to receive a square end section 136b of stud 136. By virtue of this arrangement, lever 134, while comprising two sections located on opposite sides of base 101 and joined by stud 136, functions and pivots as a unitary element.

Second section 142 of lever 134 includes a rounded engagement portion 144 and sheet-engagement bar 124 includes a rearwardly extending release tab 146 having a generally V-shaped cross section located in the arcuate path of movement of engagement portion 144. The engagement portion is adapted to coact with release tab 146 for pivoting bar 124 in a clockwise direction into release position when lever 134 is pivoted in either direction. Engagement portion 144 of lever 134 and release tab 146 coact with an overriding toggle effect, that is, there is a tendency, as portion 144 reaches the apex of the V-shaped tab, for the lever to pivot to one side of the tab so that bar 124 cannot easily be retained in release position. This toggle action is further increased by providing a tension spring 148 secured at one end to a tab 149 turned up from section 134 and at its other end to a tab 150 turned up from base 101. Spring 148 tends to pivot lever 134 past and to one side of an equlibrium position wherein engagement portion 144 is in engagement with the apex of release tab 146 and the bar 124 is in release position.

Release means are also provided for automatically pivoting sheet-engagement bar 124 into release position in response to movement of release lever 116 into inoperative position, and thereby permit threading and loading of the sheet materials through passage 54 between support plate 120 and backing plates 122. In the form shown, this means comprises at least an L-shaped lever 152 pivotally mounted on a stud 154 to the rearward portion of one of arms 102 between the arm and a side wall 47. One of crank arms 118 of release lever 116 includes a tab 156 at its end and L-shaped lever 152 includes an end section 158. Tab 156 is adapted to coact with end section 158 of lever 152 for pivoting the latter in a counterclockwise direction in response to rotation of release lever 116 in a clockwise direction into inoperative position. Sheet-engagement bar 124 includes a tab 160 at one end located in engagement with the other end section 159 of lever 152 so that, as lever 152 is pivoted in a counterclockwise direction, end section 159 coacts with tab 160 for pivoting bar 124 in a clockwise direction into release position.

Figure 5:
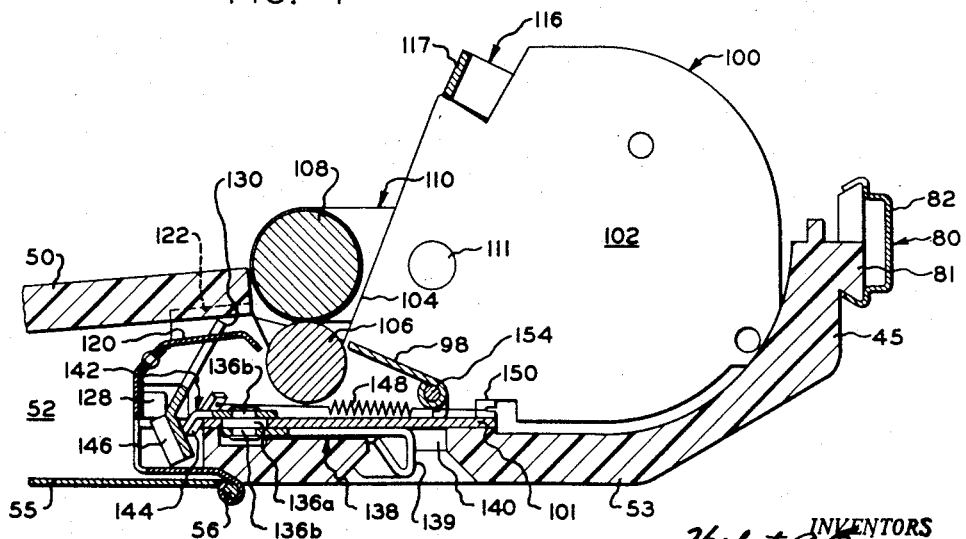
Fig. 5 is a sectional view taken substantially along the line 5—5 of Fig. 4.
Figure 6:
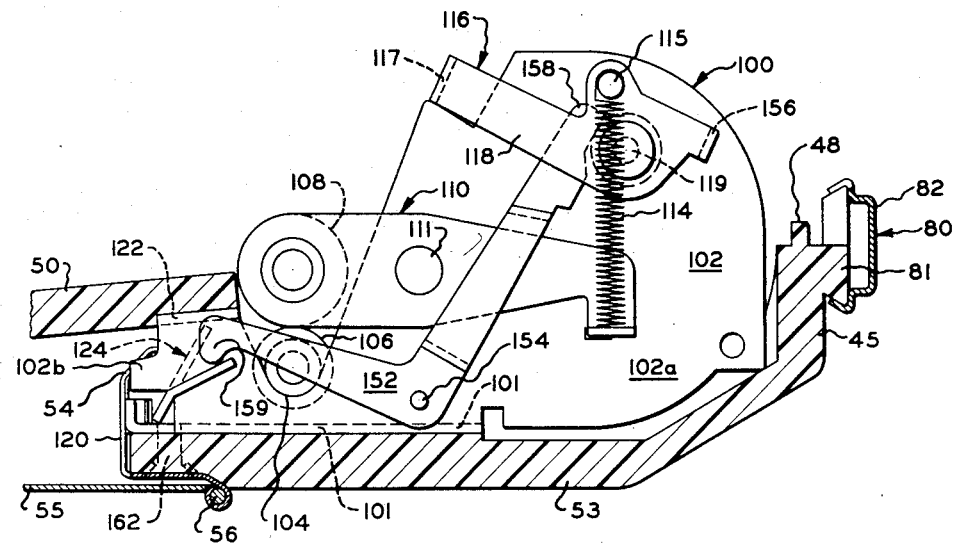
Figs. 6 and 7 are sectional views taken substantially along the line 6—6 of Fig. 4, illustrating two operating positions of the mechanism of the camera.
Figure 7:
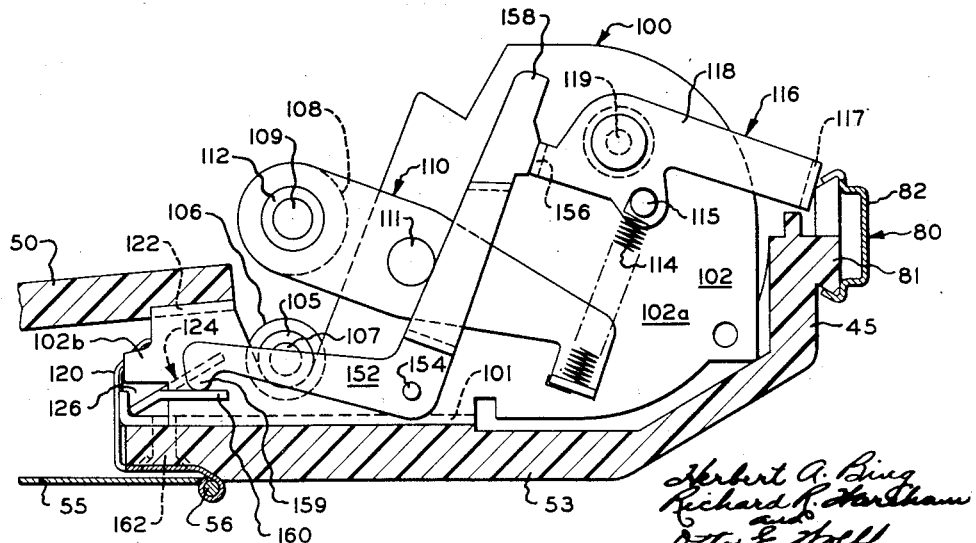
Figure 9:
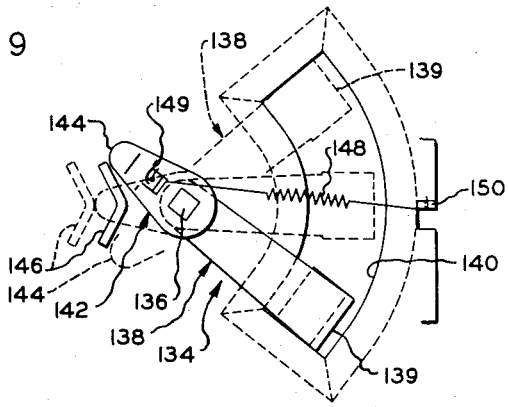
Fig. 9 is a diagrammatic plan view illustrating the means for manually operating the indexing mechanism.
Figure 8C:
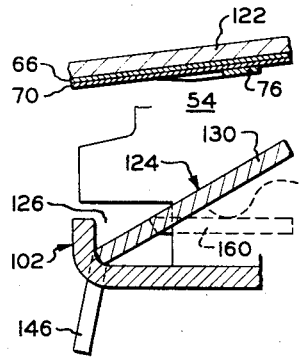
Figs. 8a, 8b and 8c are diagrammatic exaggerated sectional views illustrating the operation of the sheet-arresting mechanism of the camera.
Figure 8B:
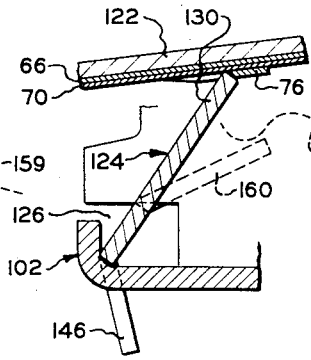
Figure 8A:
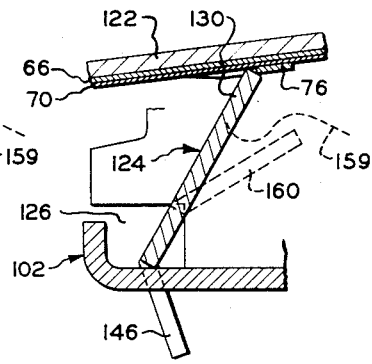
Figure 10:
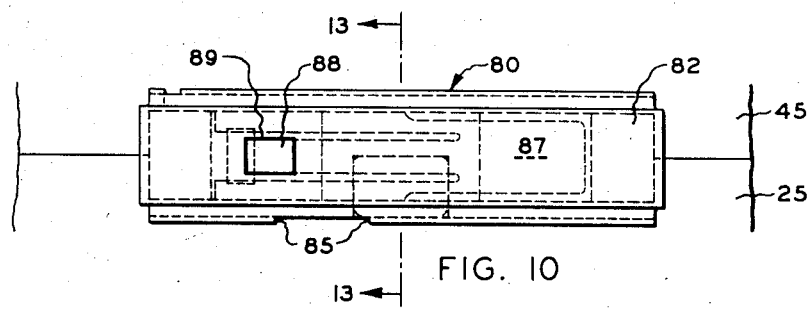
Fig. 10 is a plan view illustrating the latch for holding the two sections of the camera housing together.
Figure 11:
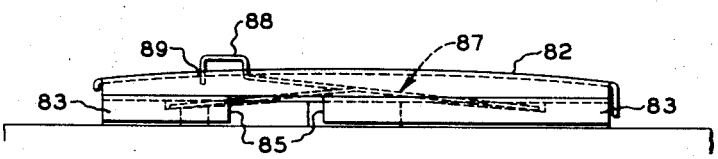
Fig. 11 is an elevational view of the latch of Fig. 10.
Figure 12:
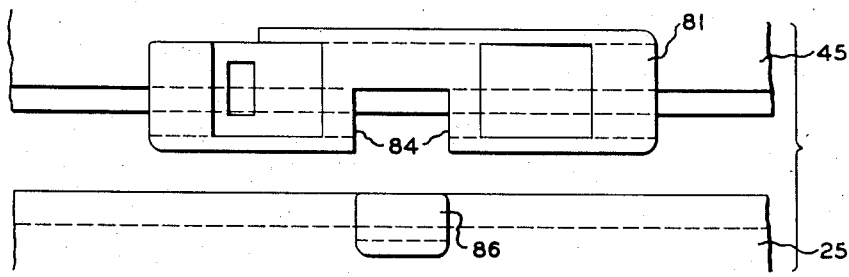
Fig. 12 is a diagrammatic plan view of portions of the latch of Fig. 10 illustrating its operation.
Figure 13:
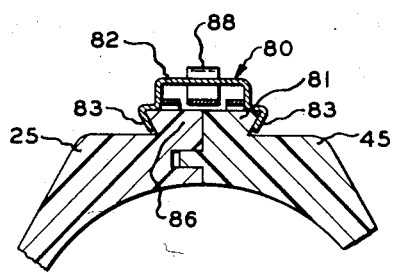
Fig. 13 is a diagrammatic sectional view taken substantially along the line 13—13 of Fig. 10.

Hinge 56, mounting door 55, and support plate 120 may comprise a unitary element as shown in Figs. 5 through 7, plate 120 extending from within passage 54 around the outside of rear wall 53 where it is secured to base 101 by such means as rivets or bolts 162. This arrangement aids in securing frame 100 within the rear section of the camera housing since bolts 162 would pass through rear wall 53, bolts being preferred to rivets since they would allow for removal of the pressure-applying and indexing mechanisms.

The camera is adapted to be loaded and the sheets threaded through the pressure-applying and indexing mechanisms with the forward and rear housing sections located apart from one another, loading being accomplished in the rear housing section preferably with that section positioned with the rear wall facing downward. To adapt the sheets for loading, the leading ends of sheets 66 and 70 are preferably secured to a single leader which is threaded through the camera, and may be formed of a relatively stiff material for this purpose. The camera mechanism is prepared for loading by pivoting release lever 116 to inoperative position for spacing rolls 106 and 108 apart and for pivoting sheet-engagement bar 124 into release position, so that the passage between support plate 120 and backing plates 122 is unobstructed by engagement portions 130 of the bar. The leader is then threaded between the rolls through passage 54 between support plate 120 and backing plates 122 into and through processing chamber 52 and passage 59. The roll of second sheet 70 is then placed on upper storage chamber 41 and photosensitive sheet 66 is extended across the forward surface of intermediate wall 50 and spool 67 is mounted in lower storage chamber 42 between mounting members 43 so that, when the two sections are assembled, the photosensitive sheet is automatically positioned on guide tracks 24. Release lever 116 is then pivoted (counterclockwise) to operative position, allowing the pressure-applying rolls to move together and the sheet-engagement bar to move into engagement position in contact with second sheet 70 or a leader attached thereto. The two housing sections are then secured to one another, cutter bar 63 is pivoted rearwardly and the portion of the leader extending thereunder is grasped for drawing the two sheets through the camera until a frame of the photosensitive sheet is in position for exposure. A pair of traps 76 are provided on second sheet 70 for engagement with the indexing mechanism for arresting the movement of the sheets when the first frame of the photosensitive sheet is in position for exposure. The camera is then ready for operation.

Operation of the camera is effected by releasing the indexing mechanism after each exposure by pivoting release lever 134, lifting the cutter bar, and grasping the portions of the sheets underlying the cutter bar for drawing the sheets through passage 59 until their movement is arrested. The cutter bar is then closed and the portions of the sheets extending therefrom may be drawn against the edge of the cutter bar for severing them from portions of the sheets remaining within passage 59 and chamber 52. As the sheets are drawn through the camera, an exposed frame of photosensitive sheet 66 and an area of second sheet 70 are moved in superposition between the pressure-applying rolls, the latter causing the rupture of a container 74 secured between the sheets adjacent the leading edge of the frame and area and spreading the fluid contents of the container in a thin layer between the associated frame and area to form a sandwich. The sandwich, as it is formed, is moved into processing chamber 52 wherein it is allowed to remain in a lighttight environment for a predetermined processing period, during which a positive print is preferably formed in the image-receiving area. At the end of this processing period, door 55 may be opened and the image-receiving area containing the positive print is stripped from the photosensitive sheet, the second sheet being perforated or precut at the borders of the image-receiving area to facilitate separation thereof from the remaining portions of the second sheet which are retained in the processing chamber. As a sandwich is formed and moved into the processing chamber, the next successive frame of the photosensitive sheet is automatically moved into position for exposure, which can be made immediately. After exposure of the photosensitive frame, the process may be repeated, in a similar manner, for each successive frame.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic appartus of the type wherein successive frames of a first sheet of photosensitive material are exposed and thereafter processed in conjunction with a second sheet by a fluid processing composition distributed between said sheets, said apparatus comprising, in combination, a casing including two sections separable from one another, means releasably securing said sections together, one of said sections including means for exposing successive frames of a first sheet of photosensitive material and cooperating with the other of said sections to provide an exposure chamber, and a unitary device mounted within said casing on the other of said sections, said device comprising a fluid-spreading mechanism including a pair of pressure-applying members mounted for movement toward and away from one another and means for urging said members toward one another, an indexing mechanism including at least a pair of engagement members, one of which is movable toward and away from the other, said engagement members being mounted for coacting in opposition to one another for engaging at least portions of one of said first and second sheets between said engagement members for arresting the movement of said sheets between said engagement members, said other section including means providing a processing chamber into which said sheets are advanced from between said pressure-applying members and a single support member mounted on said other section and providing means for mounting said fluid-spreading mechanism and said indexing mechanism intermediate said exposure and processing chambers.

2. Apparatus as defined in claim 1 wherein said device includes means for spacing apart said pressure-applying members and said engagement members to permit the loading of said camera and the threading of said sheets between said pressure-applying members and said engagement members.

3. Photographic apparatus of the type wherein successive frames of a first sheet of photosensitive material are exposed and thereafter processed in conjunction with a second sheet by a fluid processing composition spread between said sheets, said apparatus comprising, in combination, a casing including two sections separable from one another, means releasably securing said sections together, one of said sections including means for exposing successive frames of a first sheet of photosensitive material and cooperating with the other of said sections to provide an exposure chamber, and a unitary device comprising a support element mounted within said casing on the other of said sections, a fluid-spreading mechanism comprising a pair of pressure-applying members between which said first and second sheets are adapted to be advanced in superposed relation, said pressure-applying members being mounted on said support element for movement toward and away from one another and being biased toward one another for acting on opposite sides of said sheets in opposition to one another, said other section including means providing a processing chamber into which said sheets are advanced from between said pressure-applying members, and an indexing mechanism including at least one pair of engagement members between which said sheets are adapted to be advanced in superposed relation, said engagement members being mounted on said support element with one of said engagement members being mounted for movement toward and away from the other whereby said one engagement member coacts in opposition to said other engagement member on the opposite side of said sheets for engaging at least portions of one of said sheets between said one member and said other member for arresting movement of said sheets between said engagement members, said support element being mounted on said other section intermediate said exposure and processing chambers.

4. Apparatus as defined in claim 3 wherein said device includes means for spacing apart said pressure-applying members and said engagement members to permit the loading of said camera and the threading of said sheets between said pressure-applying members and said engagement members.

5. A camera of the type wherein successive frames of a first sheet of photosensitive material are exposed and thereafter processed in conjunction with a second sheet by a fluid processing composition distributed between the sheets, said camera comprising, in combination, a casing including two sections separable from one another, means releasably securing said sections together, one of said sections including means for exposing successive frames of a first sheet of photosensitive material, the other of said sections including means defining an exposure chamber, a processing chamber and a third chamber connecting said exposure and processing chambers, each frame of said photosensitive sheet being movable in sequence through said exposure chamber, wherein it is exposed, through said third chamber, wherein it is superposed with a second sheet and a fluid processing composition is spread between the sheets, and into said processing chamber, and a unitary device mounted within said third chamber on said other section, said device comprising a fluid-spreading mechanism including a pair of pressure-applying members between which said sheets are advanced in superposition and capable of coacting in opposition to one another for distributing said fluid processing composition between said sheets, an indexing mechanism including at least a pair of engagement members biased toward one another and being adapted to coact in opposition to one another for engaging at least portions of one of said sheets for arresting the movement of said sheets between said pressure-applying members and a single support member mounted on said other section and providing means for mounting said fluid-spreading mechanism and said indexing mechanism.

6. A camera of the type wherein successive frames of a first sheet of photosensitive material are exposed and thereafter processed in conjunction with a second sheet by a fluid processing composition distributed between the sheets, said camera comprising, in combination, a casing including two sections separable from one another, means releasably securing said sections together, one of said sections including means for exposing successive frames of a first sheet of photosensitive material, the other of said sections including means defining an exposure chamber, a processing chamber and a third chamber connecting said exposure and processing chambers, each frame of said photosensitive sheet being movable in sequence through said exposure chamber, wherein it is exposed, through said third chamber, wherein it is superposed with a second sheet and a fluid processing composition is spread between the sheets, and into said processing chamber, and a unitary device mounted within said third chamber on said other section, said unitary device comprising a fluid-spreading mechanism including a pair of pressure-applying members for superposing an exposed frame of said photosensitive sheet with an area of said second sheet during movement of said sheets through said third chamber into said processing chamber and for spreading a fluid processing composition in a layer between said sheets to form a sandwich, an indexing mechanism comprising at least a pair of engagement members between which said sheets are moved in superposition from between said pressure-applying members into said processing chamber, one of said engagement members being adapted to engage at least portions of one of said sheets for arresting movement of said sheets, a support member mounted on said other section within said third chamber, said pressure-applying members, including means for urging them toward one another, together with said indexing mechanism, being mounted on said support member and manually operable means mounted on said support member for spacing apart said pressure-applying members and said engagement members to permit loading of said camera and threading of said sheet materials from said third chamber between said pressure-applying members and said engagement members into said processing chamber.

7. A camera of the type wherein a first sheet of photosensitive material is exposed and thereafter processed in conjunction with a second sheet by a fluid processing composition carried by one of said sheets and distributed therebetween, said camera comprising, in combination, a casing comprising a forward section and a rear section, said sections being separable from one another, means for releasably securing said forward and rear sections to one another, said forward section including means providing an exposure aperture and means for positioning a photosensitive sheet for exposure, said rear section including means cooperating with said forward section for providing an exposure chamber within which said photosensitive sheet is positioned for exposure, an intermediate chamber adjacent one end of said exposure chamber through which said exposed photosensitive sheet is movable, a processing chamber at the rear of said exposure chamber within said rear section and a passage within said rear section communicating with said intermediate chamber and said processing chamber, and a unitary device mounted within said intermediate chamber on said rear section, said device comprising a pressure-applying mechanism including a pair of pressure-applying members biased toward one another and capable of coacting in opposition to one another for distributing a fluid processing composition between said exposed photosensitive sheet and a second sheet superposed therewith, an indexing mechanism including at least a pair of engagement members located within said passage, said engagement members being biased toward one another and being adapted to coact in opposition to one another for engaging at least portions of one of said sheets for arresting the movement of said sheets between said engagement members and a single support member mounted on said rear section and providing means for mounting said pressure-applying mechanism and said indexing mechanism.

8. A camera as defined in claim 7 wherein said device includes manually operable means for spacing apart said pair of pressure-applying members and said pair of engagement members to permit said sheets to be loaded into said camera and threaded from said intermediate chamber between said pressure-applying members and said engagement members through said passage into said processing chamber.

9. A camera for exposing successive frames of a photosensitive sheet and processing said photosensitive sheet by superposing said exposed frames with areas of a second sheet and distributing a fluid processing composition between the associated frames and areas, said camera comprising, in combination, a housing comprising a forward section and a rear section separable therefrom, means for releasably securing said forward and rear sections to one another, said forward section including exposure means and means for positioning a frame of a photosensitive sheet for exposure, portions of said forward and rear sections cooperating to provide an exposure chamber in which successive frames of said photosensitive sheet are positioned for exposure and a storage chamber adjacent one end of said processing chamber and communicating therewith, portions of said rear section defining a processing chamber behind said exposure chamber and a passage connecting said storage and processing chambers, said photosensitive sheet being movable from said exposure chamber through said storage chamber and said passage into superposition with a second sheet and into said processing chamber, a support member mounted within said storage chamber and said passage, a pair of pressure-applying members and resilient means, for urging said pressure-applying members toward one another, mounted on said support member, said photosensitive and second sheets being movable in superposed relation between said pressure-applying members for effecting the spreading of a fluid composition carried by containers associated with one of said sheets in a layer between said sheets, an indexing mechanism mounted on said support member within said passage and including at least a pair of members between which said sheets are moved and one of which is adapted to engage at least a portion of one of said sheets for arresting the movement of said sheets through said camera, and means mounted on said frame means for spacing apart said pressure-applying members and said members comprising said indexing mechanism to permit the loading and threading of said sheets from said storage chamber between said pressure-applying members through said passage between said members comprising said indexing mechanism into said processing chamber.

10. A camera of the type wherein a first sheet of photosensitive material is exposed and thereafter processed in conjunction with a second sheet by a fluid processing composition releasably carried by one of said sheets, said camera comprising, in combination, a casing comprising a first section and a second section separable from said first section, means for releasably securing said first and second sections to one another, said first section including exposure means and means for positioning successive frames of a photosensitive sheet for exposure, said second section including means cooperating with said first section to provide at least an exposure chamber within which a frame of said photosensitive sheet is positioned for exposure and means providing a storage chamber within which a supply of said second sheet is positioned, a processing chamber and a passage between said storage and processing chambers, and a unitary device mounted within said storage chamber on said second section, said unitary device comprising a pair of pressure-applying members for superposing an exposed frame of said photosensitive sheet with an area of said second sheet during movement of said sheets from said first storage chamber into said processing chamber for spreading a fluid processing composition in a layer between said sheets to form a sandwich, an indexing mechanism comprising at least two members located within said passage and providing at least a pair of members between which said sheets are moved, one of said members being adapted to engage at least portions of one of said sheets for arresting their movement, a support member mounted on said second section, said pressure-applying members, including means for urging them toward one another, together with said indexing mechanism being mounted on said support member, and manually operable means mounted on said support member for spacing apart said pressure-applying members and said pair of members comprising said indexing mechanism to permit loading of said camera and threading of said sheet materials from said storage chamber between said pressure-applying members through said passage between said members comprising said indexing mechanism into said processing chamber.

11. A camera for exposing successive frames of a first sheet of photosensitive material and thereafter processing the first sheet in conjunction with a second sheet by a fluid processing composition releasably carried by one of said sheets and distributed between said sheets, said camera comprising, in combination, a housing comprising a forward section and a rear section, said sections being separable from one another, means for releasably securing said sections to one another, exposure means including an exposure aperture mounted on said forward section, guide means located at the rear of said forward section for positioning a frame of a first photosensitive sheet for exposure, said rear section including means cooperating with a portion of said forward section for providing a first storage chamber located adjacent one side of said guide means for mounting and enclosing a supply of said photosensitive sheet material, means cooperating with a portion of said forward section to provide a second storage chamber located adjacent the opposite side of said guide means for mounting and enclosing a supply of said second sheet, an intermediate wall extending between said first and second storage chambers and cooperating with said forward section to provide an exposure chamber in which successive frames of said photosensitive sheet are positioned during exposure, a rear wall defining the rear wall of said second storage chamber and a door mounted on said rear wall and cooperating with said intermediate wall to provide a processing chamber and a passage between said second storage chamber and said processing chamber, and a unitary device mounted within said second storage chamber on said rear section, said device comprising a pressure-applying mechanism including a pair of pressure-applying members biased toward one another and capable of coacting in opposition to one another for distributing a fluid processing composition between exposed frames of said photosensitive sheet and said second sheet superposed therewith, an indexing mechanism including at least a pair of engagement members located within said passage, said engagement members being biased toward one another and being adapted to coact in opposition to one another for engaging at least portions of one of said sheets for arresting the movement of said sheets between said engagement members and a single support member mounted on said rear section and providing means for mounting said pressure-applying mechanism and said indexing mechanism.

12. A camera for exposing successive frames of a first sheet of photosensitive material and thereafter processing the first sheet in conjunction with a second sheet by a fluid processing composition releasably carried by one of said sheets and distributed between said sheets, said camera comprising, in combination, a housing comprising a forward section and a rear section separable from said forward section, means for releasably securing said sections to one another, exposure means including an exposure aperture mounted on said forward section, guide means located at the rear of said forward section for positioning a frame of a first photosensitive sheet for exposure, said rear section including means cooperating with a portion of said forward section for providing a first storage chamber located adjacent one side of said guide means for mounting and enclosing a supply of said photosensitive sheet material, means cooperating with a portion of said forward section to provide a second storage chamber located adjacent the opposite side of said guide means for mounting and enclosing a supply of said second sheet, an intermediate wall extending between said first and second storage chambers and cooperating with said forward section to provide an exposure chamber in which successive frames of said photosensitive sheet are positioned during exposure, a rear wall defining the rear wall of said second storage chamber and a door mounted on said rear wall and cooperating with said intermediate wall to provide a processing chamber and a passage between said second storage chamber and said processing chamber, and a device mounted within said second storage chamber on said rear section and comprising a pair of pressure-applying members for superposing said first and second sheets as they are advanced through said passage from said second storage chamber to said processing chamber and for distributing a fluid processing composition carried by one of said sheets in a layer between said sheets, an indexing mechanism including means for engaging at least a portion of one of said sheets for arresting the movement of said sheets, and means for spacing apart said pressure-applying members and at least a pair of cooperating members comprising said indexing mechanism whereby said sheets may be loaded into said camera and threaded through said passage between said pressure-applying members and said pair of members comprising said indexing mechanism.

References Cited in the file of this patent
UNITED STATES PATENTS

| | | |
|---|---|---|
| 1,828,205 | Schmitt | Oct. 20, 1931 |
| 2,455,111 | Carbone | Nov. 30, 1948 |
| 2,483,390 | Gannon | Oct. 4, 1949 |